UNITED STATES PATENT OFFICE.

THOMAS JOHN GREENWAY, OF ARMADALE, NEAR MELBOURNE, VICTORIA, AUSTRALIA, ASSIGNOR TO POTTER'S SULPHIDE ORE TREATMENT LIMITED, OF MELBOURNE, AUSTRALIA, A CORPORATION OF VICTORIA, AUSTRALIA.

SEPARATION OF METALLIC SULFIDS FROM SULFID ORES.

1,045,970.     Specification of Letters Patent.     Patented Dec. 3, 1912.

No Drawing.     Application filed June 10, 1909. Serial No. 501,387.

*To all whom it may concern:*

Be it known that I, THOMAS JOHN GREENWAY, metallurgist, subject of the King of Great Britain, residing at "Gunyah," Armadale street, Armadale, near Melbourne, in the State of Victoria, Commonwealth of Australia, whose post-office address is 369 Collins street, Melbourne aforesaid, have invented certain new and useful Improvements in the Separation of Metallic Sulfids from Sulfid Ores, of which the following is a specification.

It is common knowledge that when oiled particles are suspended in or floated on water, or aqueous solutions, the oiled particles will strongly attract each other, and on coming together will form cohering aggregates. It is also common knowledge that when oil is brought into contact with pulverized sulfid ores, under proper conditions, the oil will tend to attach itself selectively to the metallic sulfid particles, and leave the rocky portions of the ore free of oil.

This invention consists of a special method of making use of these properties of oiled particles and oil, for improving the separation of metallic sulfids from the rocky constituents of sulfid ores by gaseous flotation processes which are dependent upon the action of heated acidulated solutions, by rendering the flotation scum obtained by these processes more coherent and permanent.

In conducting gaseous flotation processes as at present in practice, the pulverized ore is treated with heated acidulated solutions in such a manner as to cause the evolution of carbon dioxid or other gas. This gas attaches itself in films or bubbles selectively to the particles of metallic sulfids and floats them to the surface of the heated solution as a more or less coherent aggregation of gas and metallic sulfids, or scum, which is collected in a suitable manner, and dealt with as a concentrate product; the rocky portion of the ore not being so acted upon, sinks through the solution to the bottom of the containing vessel, from which it is removed in a suitable manner and dealt with as a refuse product.

In carrying out this improved process the ore in a pulverulent condition (that is to say, ore which has been crushed fine enough to pass through screens with 30 or more meshes per linear inch) is intimately mixed with from one half of one per cent. to one per cent. or thereabout of a viscous oil, (either mineral, animal, or vegetable) having a specific gravity less than that of water, and a boiling point higher than that of water. The said mixing may be effected, either during the pulverization of the ore, or by adding the oil before, or during the passing of the pulverized ore through a disintegrator, a trough mixer, or other effective dry mixing plant. The pulverized ore, after having been thus oiled, is ready for treatment by the before mentioned gaseous processes in the usual manner, that is to say by feeding the oiled ore into a heated acidulated solution in a separating vessel and skimming, floating off, or otherwise removing the coherent buoyant scum of gasified oiled particles while the unoiled gangue particles sink and are withdrawn at the bottom.

In treating many sulfid ores by gaseous flotation without first oiling the ore particles the aggregation of the gas and metallic sulfid particles is often too feeble and transient to permit of effective flotation. The oiling of the ore particles in the manner described, overcomes this difficulty to a very marked extent, the presence of the oil increasing the coherence of the aggregation, and bringing about the production of a more persistent and permanent flotation scum, thus rendering possible the profitable treatment of a large number of ores, which cannot be effectively dealt with by the before mentioned gaseous flotation processes.

The essential feature of this invention is the preliminary oiling of the particles preparatory to gaseous flotation separation and this differs from other gaseous flotation processes in which oil is used inasmuch as that in all of them the oil is brought into contact with the particles by violent agitation in the aqueous solution to produce what is known as "froth". This violent agitation causes more or less of the flotation gas produced by the action of the acid upon the ore to be beaten out of the mixture and thereby lost while the "frothing" effect is largely dependent upon the introduction of gas (such as air) from extraneous sources. In this invention all agitation is carefully avoided and the flotation effect is entirely dependent upon the gas generated by the action of the acidulated solution upon the ore or any carbonate additions which are made to the ore for that purpose while the oil simply performs the function of rendering the scum more coherent and permanent.

I claim—

An improved process for the separation of metallic sulfids from sulfid ores which consists of first intimately mixing finely divided particles of the ore with a small proportion of viscous oil, secondly feeding the oiled ore into a heated acidulated solution, thirdly, skimming or floating off the coherent buoyant scum of gasified oiled sulfid particles and separately withdrawing the unoiled sunken gangue particles, as and for the purpose specified.

In witness whereof I have hereunto set my hand in presence of two witnesses this 15th day of March 1909.

THOMAS JOHN GREENWAY.

Witnesses:
 LESLIE LAWTON BEAR.
 AGNES T. LYONS.